Sept. 14, 1943.  D. R. LA PLACE  2,329,440
FASTENER
Filed April 2, 1941
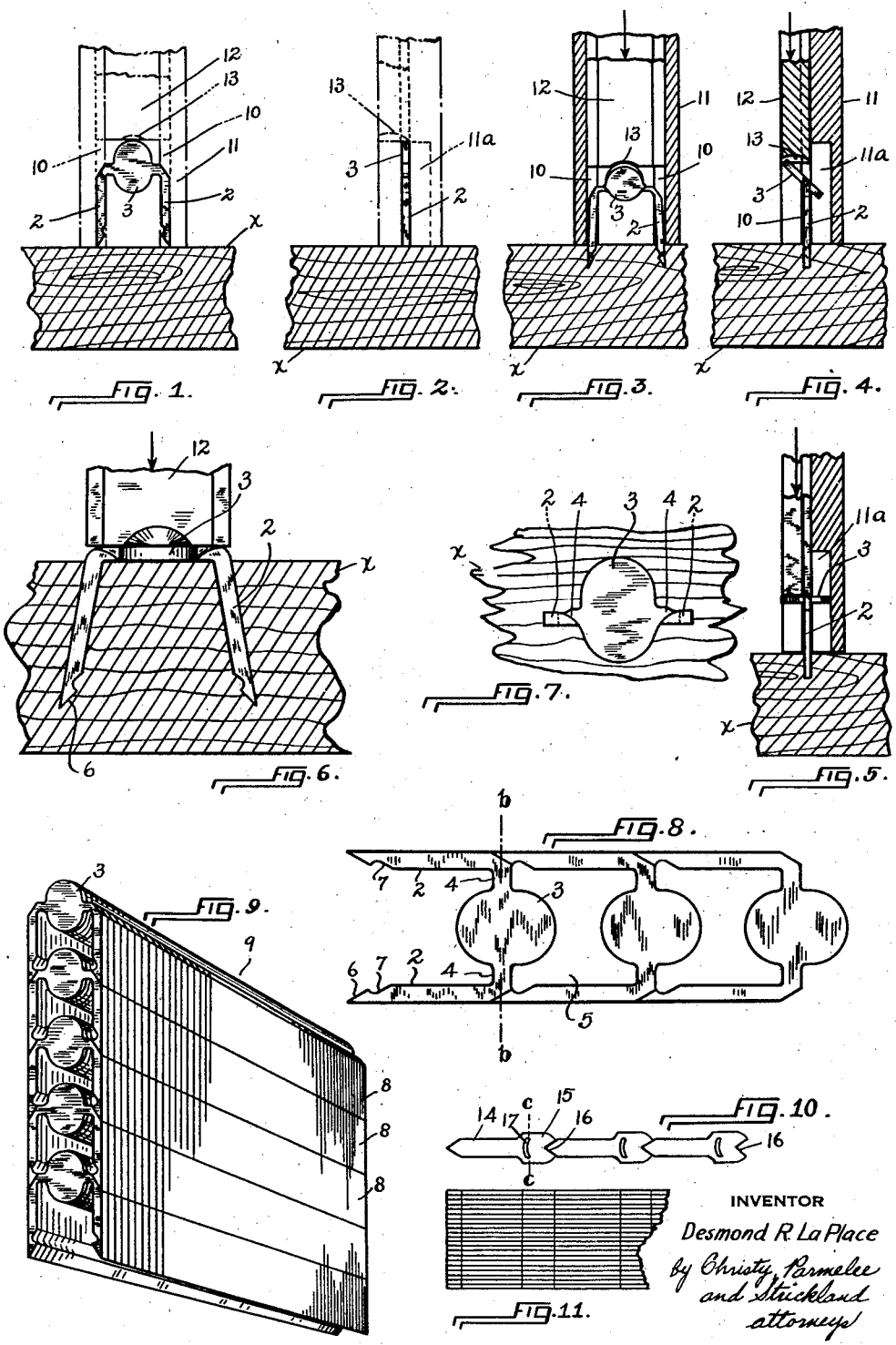
INVENTOR
Desmond R. La Place
by Christy, Parmelee
and Strickland
attorneys Patented Sept. 14, 1943

2,329,440

UNITED STATES PATENT OFFICE 2,329,440

FASTENER

Desmond R. La Place, Pittsburgh, Pa., assignor to Bocjl Corporation, Pittsburgh, Pa., a corporation of Delaware Application April 2, 1941, Serial No. 386,497

15 Claims. (Cl. 85—49)

This invention relates to driven fasteners, such as staples or the like, and to a method of fastening making use of such fasteners.

In many building operations as well as in various industrial uses it is frequently desirable to use nails having relatively large heads for securing a sheet of paper, such as roofing paper, to a structure or to secure a sheet of fabric to a supporting frame. A large head is provided on the nail to prevent the nail from being driven too far through the underlying material and to prevent the underlying material from pulling off around the fastener. Nails of this character have to be handled and used as individual units. They cannot be compactly packaged in such manner that the package can be placed in the magazine of an automatic tool, and their design does not permit of their use in an automatic tool, and because of their shape a magazine which would hold a considerable number of them would be very large and unwieldy, particularly in a portable tube.

According to the present invention there is provided a driven fastener which is intended for use as a substitute for conventional large headed nails or tacks but which is so constructed that the fasteners may be secured together in rows and the rows secured together to form a unit or biscuit containing a large number of fasteners, this unit or biscuit being of relatively small proportions and being capable of being charged into the magazine of a suitably constructed tool. Such a tool is shown, for example, in my copending application Serial No. 386,498, filed April 2, 1941. This is accomplished by forming the fastener which is preferably in the form of a staple having two legs but which may be constructed with a single leg or point with an enlarged head portion and with the leg or leg portions disposed in a common plane so that the fasteners are substantially flat and may be adhesively secured together in face-to-face relation. My invention further contemplates a method of driving wherein the driving pressure or force is initially applied to the edge portion of the fastener until the fastener has penetrated the material into which it is driven. The driving pressure is then utilized to rotate the head so that it becomes approximately perpendicular to the point or leg, after which it is driven the rest of the way into the material, and the enlarged head which was originally edgewise to the plane of the surface into which the fastener is driven is finally substantially parallel with this plane. Through the use of my invention it is possible to provide a staple or other fastener which can be assembled into rows and the rows, if desired, assembled into biscuits and the fasteners handled in the same way that ordinary staples used in stapling machines are at present arranged, and wherein the fastener will be equally or more effective than the large-headed nails which they are intended to replace. The method of driving the staple constitutes the subject matter of my copending application Serial No. 457,166, filed September 3, 1942.

My invention may be readily understood by reference to the accompanying drawing in which Figure 1 is a front elevation of a staple-like fastener made in accordance with the present invention positioned above a surface into which it is to be driven; the driving tool is illustrated in broken lines to show the initial step of driving the staple;

Figure 2 is a side elevation of Figure 1;

Figure 3 is a view generally similar to Figure 1 but showing a staple partly driven into the material into which it is to be driven and showing the head rotated part way, the driver being conventionally illustrated partially in section and partially in elevation to show the further development of the process of driving the staple;

Figure 4 is a side elevation of Figure 3;

Figure 5 is a view similar to Figure 4 showing the head of the staple turned to its final position where it is approximately parallel with the surface of the material into which the staple is being driven;

Figure 6 is a view similar to Figure 1, but on a larger scale, showing the staple completely driven and showing the final position of the driver;

Figure 7 is a top plan view of the staple driven into the material;

Figure 8 is an end view of a biscuit of staples formed according to my invention. This view also may represent the manner in which the staples are blanked from a continuous flat ribbon of metal stock.

Figure 9 is a perspective view of a biscuit comprised of several rows of staples embodying my invention;

Figure 10 is a view generally similar to Figure 8 showing a plan elevation of three single point fasteners embodying my invention and illustrating the manner in which they may be arranged in a biscuit; and Figure 11 is a fragmentary side elevation of a biscuit of fasteners of the type shown in Figure 10.

Referring first to Figures 1 to 9 of the drawing, and particularly Figure 8 which illustrates a fastener constructed in accordance with the present preferred embodiment of my invention, the fasteners are made in the form of two-legged staples, the leg portions being designated generally as 2. Each staple has an enlarged head portion 3. The head portion is connected to the top of the leg portions through extensions 4. The staple shown in Figure 8 is formed by stamping it from flat metal stock, the area designated 5 between two successive staples being punched from flat strip material. The ends of the staples are preferably beveled as shown at 6, the outside of each leg of the staple originally being straight, the bevel being entirely on the inner face of the leg. This has two advantages. One is that, as shown in Figure 6, this beveling of the points tends to cause the staple to spread as it is driven, increasing the holding power of the staple. The second advantage is that the staples may be arranged partially nested in point-to-back relation as shown in Figure 8, with the sides of the assembled unit or biscuit in a plane, and a sufficient contact surface will be provided between the points and the backs of adjacent staples to enable them to be adhesively joined together. The inner face of each leg of the staple is also preferably notched inwardly from the point as indicated at 7. This notch serves to increase the holding power of the staple and it also facilitates the blanking out of the staple from flat material. By providing a notch at 7 the punching die that cuts out the area 5 may be rounded without producing any upstanding fin on the top of the extension 4.

In use the staples as shown in Figure 8 are preferably secured together in rows 8 (see Figure 9) with the head portions 3 of the staples in face-to-face contact and with the legs of the staples in face-to-face contact. The staples are held together in a row by an adhesive substance such as is commonly used in the stapling art at the present time. This adhesive enables the staples to be held together for handling but permits each staple to be individually detached from the row in the driving tool. After the staples are arranged in rows several rows of staples are preferably put together as shown in Figure 9 with the staples in point-to-back relation, the beveled points of one row of staples resting on the inclined shoulders of the underlying row of staples. The rows of staples are cemented together by an easily frangible cement, thus forming a compact biscuit 9 which may contain several hundred staples.

The staples are preferably driven as shown in Figures 1 to 7, inclusive. In the first step of driving the staple it is brought as shown in Fig. 1 into position over the surface into which it is to be driven. A suitable driving tool is employed such, for example, as the driving tool disclosed in my copending application above referred to. In the driving tool the legs 2 of the staples are received in channels 10 in a holder 11. In the holder 11 is a slidable member 12 comprising the driver. The lower end of the driver 12 has a transversely extending notch 13 therein which is also rounded, as shown in Figure 2, in a direction transverse to the driver so that the wall of the notch defines a spheroidal surface. The guide member 11 is recessed at its lower end as indicated at 11a.

When the staple is in position to be driven the top edge of the head 3 of the staple is immediately under the recessed portion 13 of the driver. When the staple has been brought to a position to be driven the driver 12 is forced down. When the driver first moves down it bears against the edge of the head of the staple, forcing the points of the staple into the material designated x. After the points of the staple have entered the material x a slight distance the driving pressure or force exerted against the edge of the head of the staple through the spherical surface 13 will tend to create a camming action that rotates the head of the staple about the extensions 4 as an axis. Figures 3 and 4 show this rotation of the head of the staple at an intermediate stage. When the head of the staple has been rotated so that it is approximately parallel with the surface of the material x, the driving pressure will again be effective to force the staple into the material. The downward pressure will be against the flat head of the staple and on the shoulders of the staple formed by the top of the extensions 4, as clearly shown in Figure 6. When the head of the staple is turned from a vertical to a horizontal position, that is, from a plane parallel with the plane of the legs to a plane perpendicular to the plane of the legs, the metal in the extensions 4 of the staple is twisted. The recess 11a provides clearance for the portion of the head of the staple below the axis of rotation to swing upwardly. The axis of rotation defined by the line b—b in Figure 8 passes through the head of the staple so that after the staple has been driven any upward pressure against one edge of the staple tending to bend it back up into the vertical plane will be resisted by the contact which the portion of the staple on the other side of the axis makes with the surface of the material. Preferably the staple is driven by a single blow, and the entire operation of driving it takes place in an instant.

These staples may be made in various ways, depending upon where and how they are to be used. They may be used for attaching sheathing paper to the frames of buildings or roofing paper to the roof of buildings. They may be used in the tacking of decorations to walls or for the securing of fabrics or carpets in place, and by ornamentation of the heads 3 may be used for upholstery purposes. They are capable of use generally as a substitute for tacks or large-headed nails. Because the heads of the legs are initially disposed in a common plane, a large number of them may be arranged into an orderly unit as shown in Figure 9, enabling several hundred staples to be assembled and placed in the magazine of a hand tool.

While my invention is preferably embodied in a fastener having two legs, it may, as shown in Figure 10, be embodied in a fastener having a single point. In this figure, 14 designates the leg portion of the fastener and 15 is the head portion. The upper edge of the head is preferably rounded but preferably has a V-shaped notch 16 therein. A slot 17 is punched through the fastener so as to weaken the fastener transversely. When the staple is driven pressure is first applied to the top edge of the head of the staple, causing the point of the staple to penetrate the material into which it is driven. The application of further pressure causes the head portion to rotate, the axis of rotation traversing the head, the line c—c indicating the axis of rotation. After the head of the staple has been turned 90° to its original position the driving operation is continued. The notch 16 in the head of one staple is provided to receive the point of another staple so as to enable the staples to be nested and secured together in biscuit form similar to the biscuit shown in Figure 9. The interfitting of the notches and points of the staples in the biscuit provide adequate contact surface for the cementing of the staples together in point-to-back relation. The staples, of course, are cemented together in rows in face-to-face relation as previously described in connection with the form of staple having two legs.

While I have illustrated and described certain specific embodiments of my invention it will be understood that this is merely by way of illustration and that the fasteners may be otherwise constructed within the contemplation of my invention and under the scope of the following claims.

I claim:

1. A fastener of the class described having a head portion and a leg portion disposed in a common plane whereby they may be arranged in rows in face-to-face relation, the head portion being adapted to be rotated to a plane approximately perpendicular to the leg, the point of juncture between the head and the leg portion defining the axis of rotation, this axis traversing a portion of the head above its lowermost edge, the legs extending below the lowermost edge of the head.

2. A driven fastener having a head portion and a leg portion disposed in a common plane whereby they may be arranged in rows in face-to-face relation, the head portion being substantially wider than the leg portion, the head portion being adapted to be rotated to a plane approximately perpendicular to the leg, the point of juncture between the head and the leg portions defining the axis of rotation, this axis traversing a portion of the head above its lowermost edge, the legs extending below the lowermost edge of the head.

3. A staple having head and leg portions disposed in a common plane whereby they may be arranged in rows in face-to-face relation, the head being rotatable in use to a plane perpendicular to the plane of the leg, the point of attachment of the leg and head portions defining an axis of rotation which traverses the head portion above the lowermost edge of the head, the leg portion projecting downwardly below the lowermost edge of the head.

4. A staple having a head portion and having leg portions, the head and legs being disposed substantially in a plane whereby they may be arranged in rows in face-to-face relation, the legs pointing in approximately the same direction, and being joined to the head at opposite sides of the head, the head extending above and below the line of attachment of the legs with the head, the legs projecting downwardly below the lowermost edge of the head.

5. A staple having a head portion with extensions at opposite sides thereof attached thereto between the upper and lower edges of the head, legs pointing in generally the same direction formed integrally with said extensions, the legs, the extensions, and the head being disposed in a substantially common plane whereby they may be arranged in rows in face-to-face relation.

6. A staple having when driven a head portion and a leg portion attached to each side of the head portion, the points of attachment being separated by an intervening span of the head, the metal joining the head and leg portions being twisted, the head portion extending laterally from the plane of the legs in the driven form of the staple.

7. A staple integrally formed from sheet metal having head and leg portions, the metal joining the head and leg portions being twisted about an axis of rotation traversing the head portion, the head portion projecting laterally from the plane of the legs in the driven form of staple.

8. A staple integrally formed from flat sheet metal having head and leg portions disposed in a common plane, the head being of less width than the distance between the leg portions to enable the fasteners to be nested with the leg portion of one staple extending over the head portion of another on which it is super-imposed, the head portions of each staple extending above and below the top of the legs and being disposed between the legs.

9. A new article of manufacture comprising an integral sheet metal fastener having a flat head portion and leg portions which point in approximately the same direction, the head and leg portions being disposed in the common plane of the sheet from which the fastener is formed, the leg portions being connected to opposite sides of the head portion and extending beyond the lowermost edge of the head.

10. As a new article of manufacture a fastener having a head portion and two leg portions attached to the head portion with the head portion lying between the two leg portions, the leg portions being joined to the head portion between its upper and lower edges and having their free ends projecting beyond the lowermost edge of the head.

11. As a new article of manufacture a fastener having a head portion and two leg portions which point in the same general direction attached to the head portion with the head portion located between the two leg portions, the head and leg portions being connected through integral extensions on the head and leg portions which extensions are adapted to be twisted when the staple is driven, the head portion initially extending upwardly beyond the legs to increase the over-all height of the fastener.

12. A new article of manufacture comprising a staple integrally stamped from sheet metal and having an enlarged head portion and having two leg portions pointing approximately in the same direction and attached to the head portion on opposite sides thereof, the free ends of the leg portions being beveled and being notched inwardly from the beveled terminal, the top of the staple being beveled where the legs join the head whereby the beveled portions of one staple may be received between the leg portions of a superimposed staple for packaging or storage purposes.

13. A staple having a top portion and depending legs which are in a plane, the top portion extending upwardly above the tops of the legs and being of lesser width than the distance between the legs and being joined to the legs by inwardly extending integral connecting portions at the tops of the legs, whereby the top of the staple may be turned to a plane of 90° from the plane of the legs while the legs are held in the guides of a driving implement, the lesser width of the head enabling the head to clear the guides, the top also having a part which extends down between the legs below the tops of the legs.

14. A staple having a top portion and depending legs, the top portion extending upwardly above the tops of the legs and being joined to the legs by portions of the legs which are inwardly and upwardly sloped at the top, these portions of the legs being at least as great as the thickness of the material of the legs whereby the top portion of one staple may be nested between the legs of a superimposed staple.

15. A staple having a top portion and depending legs which are in the same plane, the top portion extending upwardly above the tops of the legs and being of lesser width than the distance between the legs and being joined to the legs by inwardly extending integral connecting portions at the tops of the legs whereby the top of the staple may be turned to a plane of 90° from the plane of the legs while the legs are held in the guides of a driving implement, the lesser width of the head enabling the head to clear the guides of said driving implement while being turned.

DESMOND R. LA PLACE.